United States Patent
Bui et al.

(10) Patent No.: US 7,990,649 B2
(45) Date of Patent: Aug. 2, 2011

(54) METHOD AND APPARATUS TO SET A WRAP ANGLE OF A READ/WRITE HEAD

(75) Inventors: Nhan Xuan Bui, Tucson, AZ (US);
Reed Alan Hancock, Tucson, AZ (US);
Robert Allen Hutchins, Tucson, AZ (US); Eiji Ogura, Yamato (JP);
Kazuhiro Tsuruta, Yamata (JP)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 12/505,439

(22) Filed: Jul. 17, 2009

(65) Prior Publication Data
US 2011/0013313 A1    Jan. 20, 2011

(51) Int. Cl.
*G11B 17/00* (2006.01)
*G11B 5/584* (2006.01)
*G11B 27/36* (2006.01)
*G11B 15/60* (2006.01)
*G11B 15/00* (2006.01)
*G11B 21/02* (2006.01)

(52) U.S. Cl. .... 360/71; 360/77.12; 360/31; 360/130.21; 360/90; 360/75

(58) Field of Classification Search ........................ None
See application file for complete search history.

(56) References Cited

U.S. PATENT DOCUMENTS

| | | | |
|---|---|---|---|
| 4,204,234 A | 5/1980 | Noble | |
| 4,647,992 A | 3/1987 | Vinal | |
| 4,827,362 A | 5/1989 | Baba | |
| 6,697,209 B2 | 2/2004 | Hughes et al. | |
| 6,700,733 B1 * | 3/2004 | Biskeborn | 360/90 |
| 6,760,177 B2 * | 7/2004 | Biskeborn | 360/71 |
| 6,940,682 B2 * | 9/2005 | Bui et al. | 360/77.12 |
| 7,102,845 B2 | 9/2006 | Saliba et al. | |
| 2004/0252399 A1 | 12/2004 | Maeda et al. | |
| 2007/0201160 A1 | 8/2007 | Albrecht et al. | |

* cited by examiner

*Primary Examiner* — Andrew L Sniezek
(74) *Attorney, Agent, or Firm* — Dale F. Regelman; Quarles & Brady LLP

(57) ABSTRACT

A method is presented for setting a wrap angle of a read/write head having a servo element and multiple read elements, where the servo element and the read elements can detect a servo signal. The method includes moving a sequential information storage medium having a longitudinal axis and a servo band encoded therein adjacent to the read/write head. The longitudinal axis and a flat upper surface of the read write head define the wrap angle. The method further includes detecting the servo signal using one of the read elements. If the read element is unable to detect the servo signal, then the remaining read elements are sensed to detect the servo signal.

10 Claims, 5 Drawing Sheets

METHOD AND APPARATUS TO SET A WRAP ANGLE OF A READ/WRITE HEAD

FIELD OF THE INVENTION

The present invention relates generally to tape drives, and more particularly to setting a wrap angle with respect to a read/write head by monitoring servo bands detectable by both servo elements and read/write elements.

BACKGROUND OF THE INVENTION

Certain data storage devices operate by moving a sequential information storage medium across a read head having multiple read/write elements. To efficiently read and write data to and from the tape, it is necessary that the tape be in physical contact with the read head. To maintain contact between the sequential information storage medium and the read head, the sequential information storage medium is directed towards the read head at an angle, called the wrap angle, such that an air pressure differential is created which presses the tape against the read/write head.

Such a wrap angle is set by adjusting upwardly or downwardly the position of a roller disposed adjacent the read head. The roller position must be set during data storage device manufacture or maintenance. Prior art apparatus and methods require a time-consuming process to determine a nominal wrap angle, and then position the roller using that nominal wrap angle.

SUMMARY OF THE INVENTION

In one implementation, a method is presented for setting a wrap angle of a read/write head comprising a roller, a sloping upper surface, a servo element, and a plurality of servo band detection enabled read elements ("Enabled Read Elements"), wherein the servo element and each of the plurality of Enabled Read Elements can detect a servo band. The method moves a sequential information storage medium across the roller and the sloping upper surface at a wrap angle, wherein the sequential information storage medium comprises a servo band encoded therein and a longitudinal axis, wherein the longitudinal axis and the sloping upper surface define the wrap angle. The method further detects the servo band, determines a nominal wrap angle, and sets an operating wrap angle.

In another implementation, an article of manufacture having a computer readable medium having computer readable program code disposed therein is presented for setting a wrap angle of a read/write head comprising a roller, a sloping upper surface, a servo element, and a plurality of servo band detection enabled read elements ("Enabled Read Elements"), wherein the servo element and each of the plurality of Enabled Read Elements can detect a servo band. The computer readable program code includes a series of computer readable program steps to effect moving a sequential information storage medium across the roller and the sloping upper surface at a wrap angle, wherein the sequential information storage medium comprises a servo band encoded therein and a longitudinal axis, wherein the longitudinal axis and the sloping upper surface define the wrap angle. The computer readable program code includes a series of computer readable program steps to effect detecting the servo band, determining a nominal wrap angle, and setting an operating wrap angle.

In yet another implementation, a computer program product encoded in a computer readable medium and useable with a programmable computer processor is presented for setting a wrap angle of a read/write head comprising a roller, a sloping upper surface, a servo element, and a plurality of servo band detection enabled read elements ("Enabled Read Elements"), wherein the servo element and each of the plurality of Enabled Read Elements can detect a servo band. The computer program product includes computer readable program code that causes the programmable processor to move a sequential information storage medium across the roller and the sloping upper surface at a wrap angle, wherein the sequential information storage medium comprises a servo band encoded therein and a longitudinal axis, wherein the longitudinal axis and the sloping upper surface define the wrap angle. The computer program product includes computer readable program code that causes the programmable processor to detect the servo band, determine a nominal wrap angle, and set an operating wrap angle.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

This invention is described in preferred embodiments in the following description with reference to the FIGs., in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
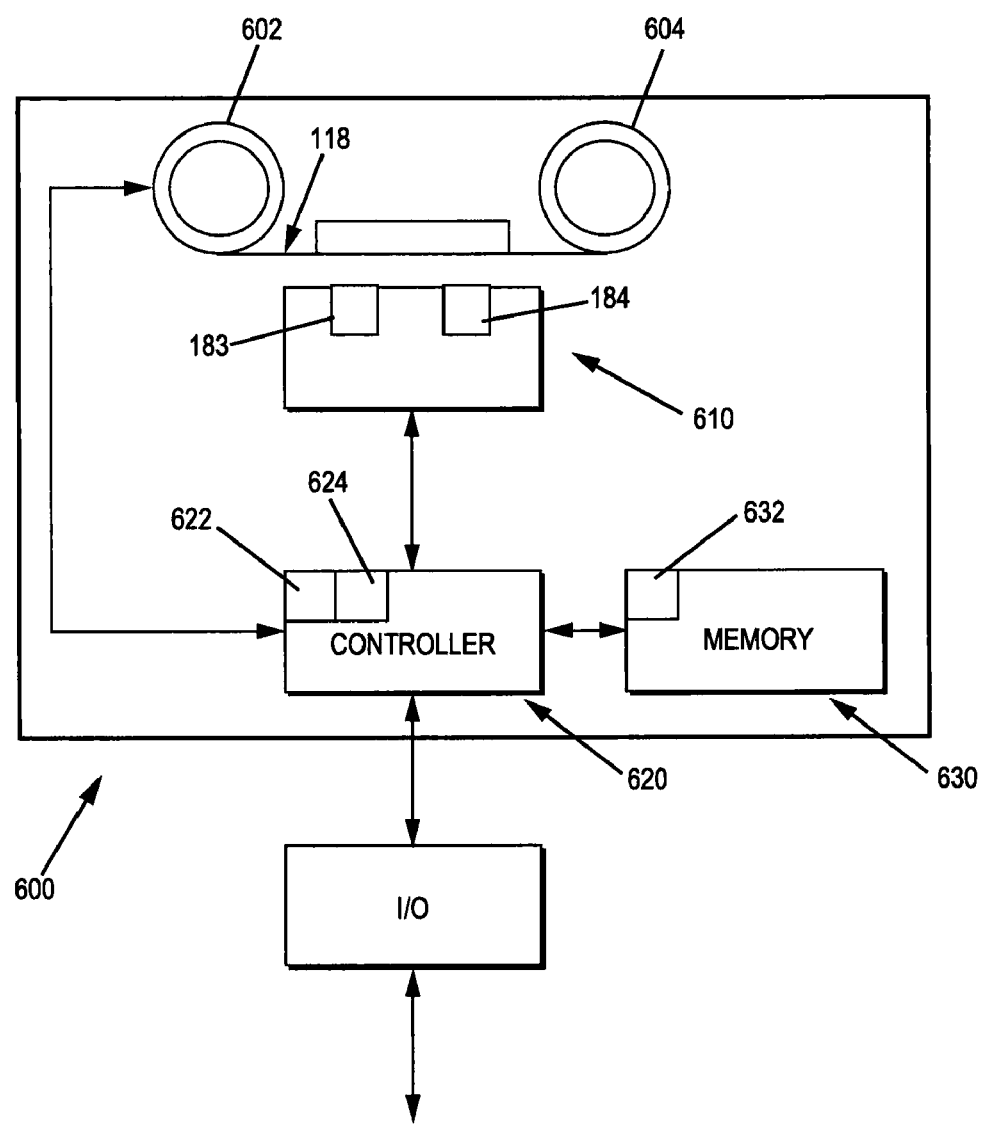
FIG. 6 is a block diagram illustrating Applicants' data storage device.

Referring now to FIG. 6, when writing data to a sequential information storage medium 118 (FIGS. 1, 2, and 3), such as a magnetic tape, a portion of the medium is disposed on a first rotatable reel, such as reel 602, and a portion of the medium is disposed on a second rotatable reel, such as reel 604. The rotatable reels are moved such that sequential information storage medium 118 is moved from one reel, past read/write head 610, and onto the other reel. Read/write head 610 comprises write element 183 and read element 184. Write element 183 encodes information in sequential information storage medium 118 as that medium travels across write element 183. Read element 184 detects encoded signals as information in sequential information storage medium 118 travels across read element 184. In certain embodiments, a read element and a write element comprise an integral assembly. As those skilled in the art will appreciate, read/write head 610 may comprise other elements and components not shown in FIG. 6.

In the illustrated embodiment of FIG. 6, read/write head 610 is in communication with controller 620. In certain embodiments, controller 620 is integral with read/write head 610. Further in the illustrated embodiment of FIG. 6, controller comprises processor 622 and data buffer 624. Controller 620 is in communication with computer readable medium 630. Instructions 632 are encoded in computer readable medium 630.

In certain embodiments, computer readable medium 630 is integral with controller 620. In the illustrated embodiment of FIG. 6, reel 602, reel 604, read/write head 610, controller 620, and computer readable medium 630 are disposed within a drive apparatus 600. As those skilled in the art will appreciate, drive apparatus 600 may comprise other elements and components not shown in FIG. 6.

Figure 1:
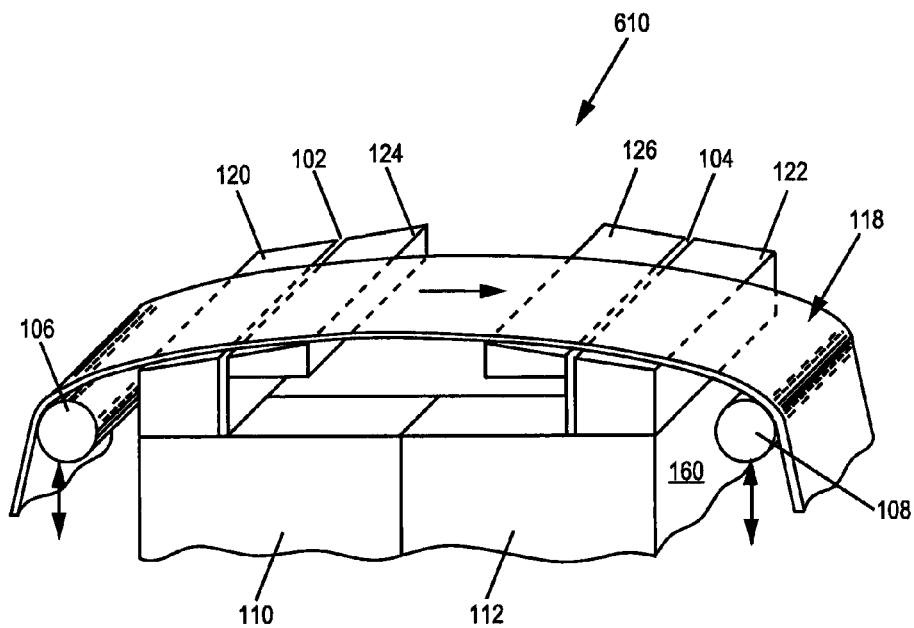
FIG. 1 is a perspective view of Applicants' read/write head.
Figure 1:
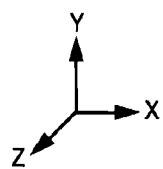
Figure 2:
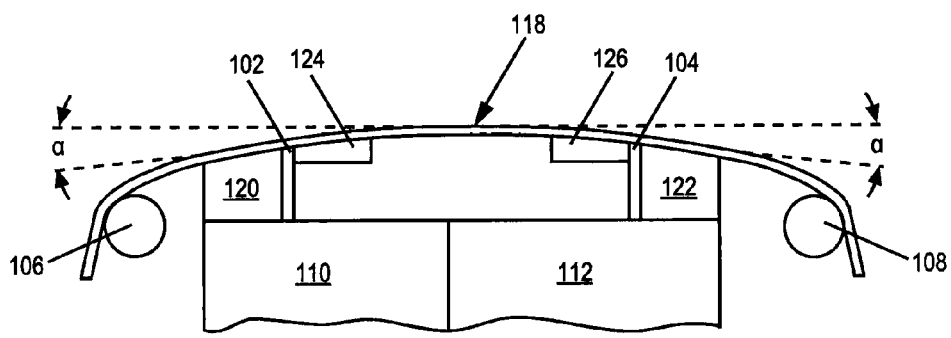
FIG. 2 is a side view of Applicants' read/write head in relation to a sequential information storage medium.

FIG. 1 depicts read/write head 610 having a sequential information storage medium 118 disposed thereon. FIG. 2 presents an end view of read/write head 610 from FIG. 1. As can be seen in the illustrated embodiments of FIGS. 1 and 2, read/write head 610 includes a left sensor block 110 and a right sensor block 112, each having a substrate with a sensor element strip formed thereon (substrate 120 with sensor element strip 102 and substrate 122 with sensor element strip 104, respectively). Cover pieces 124 and 126 are bonded to the upper portion of sensor element strips 102 and 104, respectively, thereby providing protection for sensor element strips 102 and 104 as well as base 160.

While not illustrated, sensor element strips 102 and 104 include multiple servo elements, data write elements, and data read elements. As will be understood by one of ordinary skill in the art, the quantity of read/write elements per sensor element strip is typically a function of the quantity of grouped data tracks per module desired. Typically, each sensor element strip 102 and 104 will include two servo elements, one at either end. A plurality of read/write elements are disposed between the two servo elements. In certain embodiments, the implementation of a tape drive may include two, or more, read elements and two, or more, write elements on each sensor element strip 102 and 104.

In certain embodiments, the read/write elements may be paired on sensor element strips 102 and 104. Such an embodiment reduces manufacturing costs and allows for a more dynamically articulated system. However, in certain embodiments, paired read/write elements are located on the same sensor element strip.

To aid in aligning read/write head 610, sequential information storage medium 118 is typically manufactured having one or more servo bands disposed thereon. As sequential information storage medium 118 moves across read/write head 610, the servo elements disposed on sensor element strips 102 and 104 can detect the servo bands and generate servo signals, wherein those servo signals are used to position read/write head 610.

As can be seen in the illustrated embodiments of FIGS. 1 and 2, in certain embodiments, rollers 106 and 108 are disposed on either side of read/write head 610 and act as guides for adjusting a tape wrap angle. In such embodiments, when moving from the right to the left in FIGS. 1 and 2, sequential information storage medium 118 passes over roller 106 before moving across read/write head 610. When moving from the left to the right in FIGS. 1 and 2, sequential information storage medium 118 passes over roller 108 before moving across read/write head 610. The position of rollers 106 and 108 can be adjustable upwardly and downwardly.

Figure 3A:
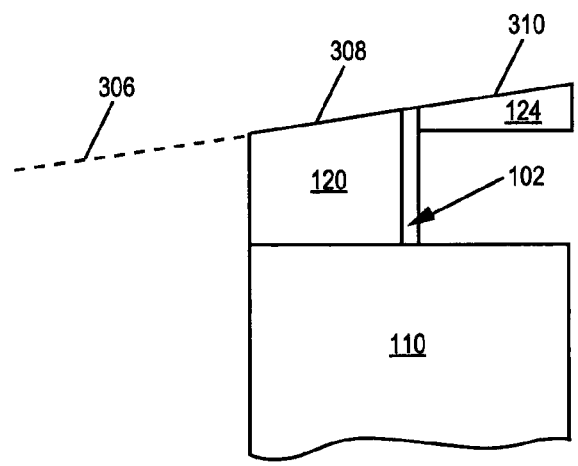
FIG. 3A is an enlarged side view of Applicants' read/write head.
Figure 3B:
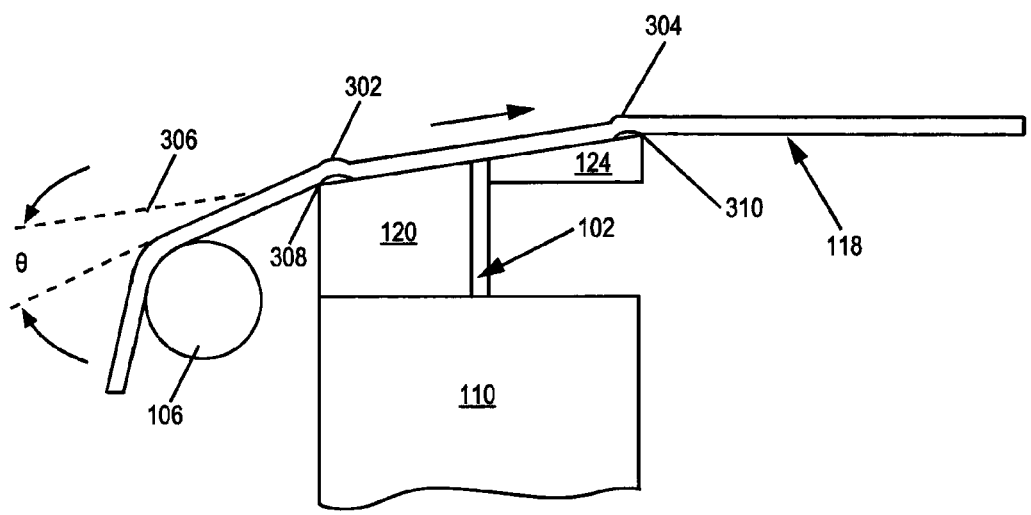
FIG. 3B is an enlarged side view of Applicants' read/write head illustrating a tape wrap angle.

Referring now to FIG. 3A, substrate 120 comprises a sloping upper surface 308. Line 306 comprises an extension of sloping upper surface 308. FIG. 3B comprises an enlarged view of read/write head 610 illustrating sequential information storage medium 118 disposed over roller 308 and across senor element strip 102. Roller 106 can be moved bidirectionally along the Y axis of FIG. 1 to adjust a wrap angle θ. If θ is set at approximately 0 degrees, a thin film of air is drawn between sequential information storage medium 118 and surface 308 as sequential information storage medium 118 moves. Such an air film prevents the servo readers disposed in read/write head 610 from detecting the servo bands encoded in sequential information storage medium 118.

Increasing the wrap angle θ by a small increment, such as approximately 0.1 degrees, edge 308 disrupts and prevents air film entering between sequential information storage medium 118 and the flat upper surface. Such a situation creates an air pressure differential above and below sequential information storage medium 118, pressing sequential information storage medium 118 into contact with the flat surface and therefore with the servo elements of read/write head 610.

A nominal wrap angle θ of approximately 0.1 degrees is required to obtain the optimal signal strength from sequential information storage medium 118, while a wrap angle θ of less than approximately 0.1 degrees produces little to no signal. Furthermore, a wrap angle θ of greater than approximately 5 degrees is also undesirable. As can be seen in the illustrated embodiment of FIG. 3B, bump 302 is created in sequential information storage medium 118 due to the stiffness of sequential information storage medium 118 and the necessity to bend sequential information storage medium 118 over edge 308 of substrate 120. Similarly, a bump 304 is formed at edge 310 of cover 124. When wrap angle θ is greater than approximately 5 degrees, tribological, wear, and other effects, begin to degrade the performance of read/write head 610.

Properly setting rollers 106 or 108 to define an optimal the wrap angle θ is significant to the proper operation of a data storage system. A variation in the wrap angle θ of even 0.1 degrees can adversely affect the operation of the tape head. Furthermore, as described in U.S. Pat. No. 6,760,177, assigned to the common assignee hereof and hereby incorporated herein by reference, a nominal wrap angle is about 1.8 degrees.

During manufacture and/or maintenance of a data storage device comprising read/write head 610, the position of rollers 106 and 108 must be set. To set rollers 106 and 108, a servo band is monitored by the servo elements disposed on read/write head 610 as sequential information storage medium 118 moves across read/write head 610. Adjustable roller 106 is set in a first position with wrap angle θ equal to 3-4 degrees. At this initial angle, the servo elements can detect the servo bands, and each servo element generates a servo signal in a servo channel. Roller 106 is then moved upwardly along the Y axis of FIG. 1 thereby reducing the wrap angle while the servo band is monitored. When the wrap angle is reduced to a nominal value, a servo signal in a servo channel will suddenly cease. An air film has been created under the tape, and therefore, the servo elements can no longer detect the servo bands.

Servo band detection is strongest just before the nominal value is reached, and therefore, an operating wrap angle value for the wrap angle is set to the nominal value offset by a small increment. By monitoring the servo signal it is possible to determine when the wrap angle reaches the nominal angle and to adjust the wrap angle to an operating value. In certain embodiments, an operating wrap angle value is about 1.8 degrees.

The wrap angle can be set to the nominal value by starting the adjustment process from a position where the wrap angle is less than the nominal value. In such embodiments, initially no signal will be detected. The wrap angle is increased while a servo signal is monitored. The nominal wrap angle value, in such an embodiment, is defined as the wrap angle at which a servo signal is first present in a servo channel.

In actual practice, however, it has been proven difficult to set a wrap angle to a nominal value. Generally, the roller position where a servo signal ceases (or commences, depending on the embodiment) must be determined several times to verify a wrap angle nominal value. Referring once again to FIG. 2, in each iteration of the process, a sequential information storage medium is mounted such that the medium overwraps read/write head 610. Repetitive mounting and dismounting of the sequential information storage medium and the resulting overwrapping and unwrapping of read/write head 610, can cause sequential information storage medium 118 to move laterally along the Z axis of FIG. 1 relative to read/write head 610. If such a lateral shift is substantial, servo elements on read/write head 610 will be unable to detect a servo band.

Figure 4:
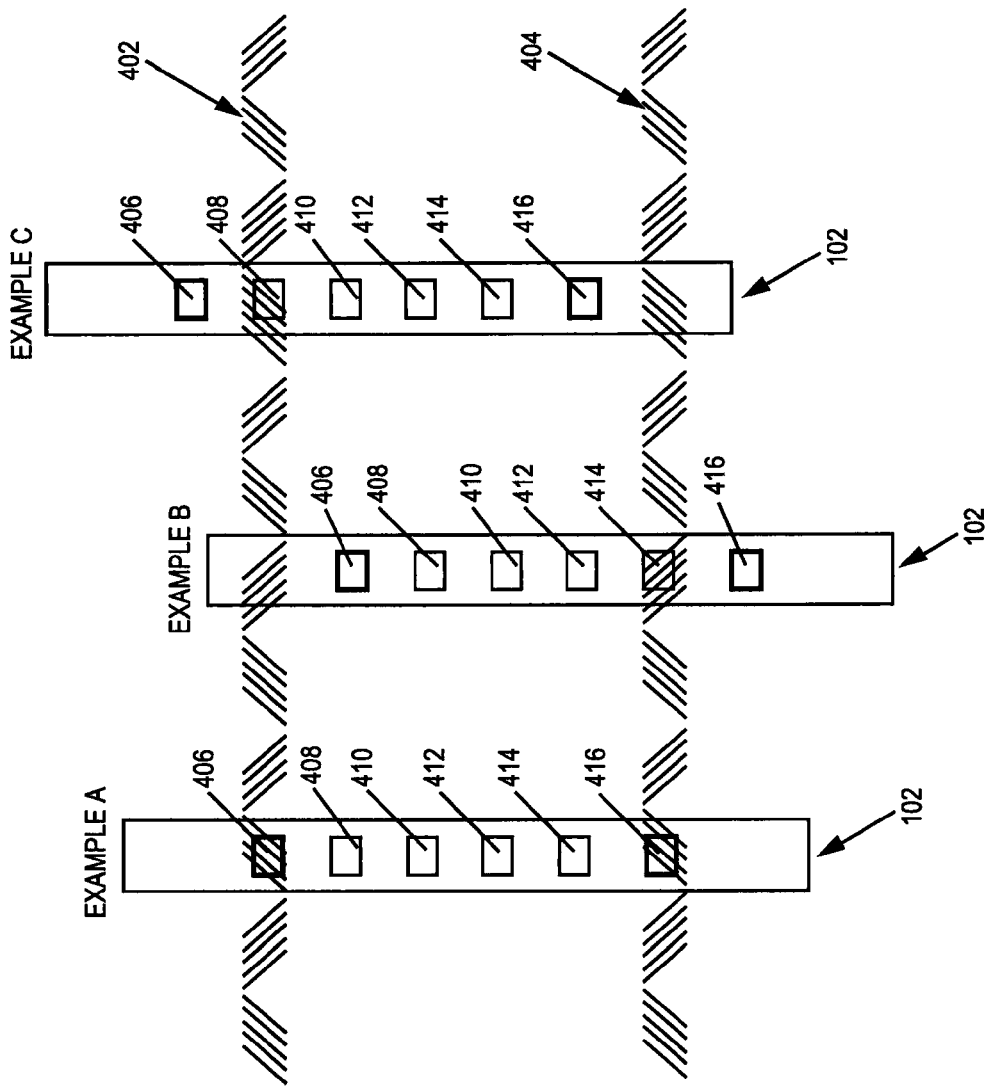
FIG. 4 is a block diagram depicting an exemplary sequential information storage medium wherein the sequential information storage medium has shifted relative to the servo elements and read elements of Applicants' read/write head.

FIG. 4 illustrates this effect in reference to sensor element strip 102 having servo elements 406 and 416 and read elements 408, 410, 412, and 414. When sequential information storage medium 118 is aligned with sensor element strip 102, here depicted as example A, servo elements 406 and 416 are positioned adjacent servo bands 402 and 404, respectively, and can detect those servo bands. When sequential information storage medium 118 is shifted along the Z axis of FIG. 1 relative to sensor element strip 102, as illustrated in example B or example C, servo elements 406 and 416 can no longer detect servo bands 402 and 404, respectively. Such a servo band non-detection situation prevents performing a wrap angle determination, and thereby, complicates data storage device adjustment.

Applicants' invention comprises a method to set the wrap angle even if sequential information storage medium 118 has shifted laterally such that servo elements 406 and 416 cannot detect servo bands 402 and 404, respectively. Referring once again to FIG. 4, when sequential information storage medium 118 has shifted laterally along the Z axis of FIG. 1, in a first direction in Example B or in the opposite direction in Example C, a read element may be disposed adjacent a servo band 402 and/or 404. By way of example and not limitation, in example B read element 414 is adjacent servo band 404 and in example C read element 408 is adjacent servo band 402.

Prior art read elements cannot detect servo bands. However, Applicants' servo band detection enabled read elements ("Enabled Read Elements") such as Enabled Read Elements 406, 408, 410, 412, and 414, can read data tracks encoded in a sequential information storage medium and in addition can detect servo bands encoded in that sequential information storage medium. Therefore, by using Enabled Read Elements a servo band can still be detected even when a dedicated servo element cannot detect that servo band.

Figure 5:
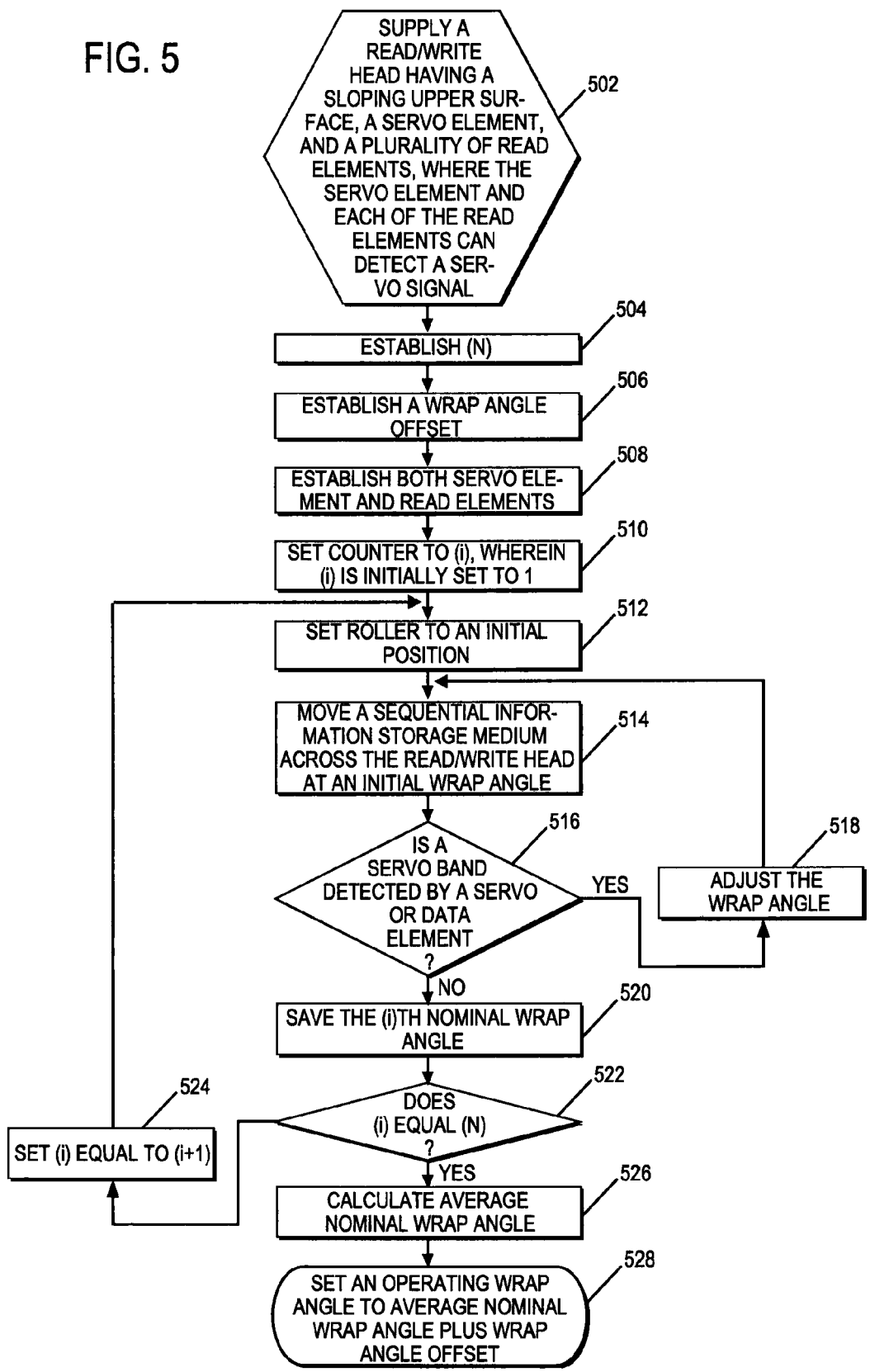
FIG. 5 is a flowchart presenting an exemplary embodiment of Applicants' invention.

Applicants' Enabled Read Elements comprising servo signal detection capability is described in U.S. Pat. No. 6,940,682, assigned to the common assignee hereof, and hereby incorporated herein by reference. FIG. 5 summarizes Applicants' method to use Enabled Read Elements to set an operating wrap angle in a data storage device.

Referring now to FIG. 5, in step 502 the method provides a read/write head, such as read/write head 610 (FIGS. 1 and 2), comprising a sloping upper surface, a roller, a servo element, such as servo element 406 and/or 416 (FIG. 4), and a plurality of Enabled Read Elements, such as read elements 408, 410, 412, and 414 (FIG. 4), where both the servo element and each Enabled Read element can detect a servo band.

In step 504, the method establishes a number of (N), wherein the procedure to determine a wrap angle is repeated (N) times.

In step 506, the method establishes a wrap angle offset. In certain embodiment, the wrap angle offset is 0.1 degree. In certain embodiment, the wrap angle offset is 0.5 degree. In certain embodiment, the wrap angle offset is 1.0 degree.

In step 508, the method enables the servo element of step 502 and each of the Enabled read Elements of step 502. In step 510, the method sets an iternation counter (i) to 1. In step 512, the method disposes the roller of step 502 in an initial position.

In step 514, the method moves a sequential information storage medium, such as sequential information storage medium 118 (FIGS. 1, 2, and 3), across the roller and then across the read/write head, wherein the sequential information storage medium comprises a longitudinal axis and a servo band encoded therein, such as servo bands 402 and/or 406 (FIG. 4).

The longitudinal axis of the sequential information storage medium and a sloping upper surface of the read/write head define a wrap angle. In certain embodiments, the roller is positioned in step 512 such that an initial wrap angle is about 5 degrees. In other embodiments, the roller is positioned in step 512 such that an initial wrap angle is about 0 degrees.

In step 516, the method determines if a servo band is detected by the servo element or any of the Enabled Read Elements. If the method determines in step 516 that a servo band is detected, then the method transitions from step 516 to step 518 wherein the method moves the roller thereby adjusting the wrap angle. If the initial wrap angle was about 5 degrees, then in step 518 the roller is moved along the Y axis of FIG. 1 such that the wrap angle is decreased. Alternatively, if the initial wrap angle was about 0 degrees, then in step 518 the roller is moved along the Y axis of FIG. 1, such that the wrap angle is increased. The method transitions from step 518 to step 514 and continues as described herein.

If the method determines in step 516 that a servo band is not detected, then the method transitions from step 516 to step 520 wherein the method saves an (i) wrap angle. In step 522, the method determines if (i) equals (N). If the method determines in step 522 that (i) does not equal (N), then the method transitions from step 522 to step 514 wherein the method sets (i) equal to (i+1). The method transitions from step 524 to step 512 and continues as described herein.

If the method determines in step 522 that (i) does equal (N), then the method transitions from step 522 to step 526 wherein the method averages the saved (N) determined wrap angles to calculate a nominal wrap angle. In step 528, the method sets an operating wrap angle equal to the nominal wrap angle of step 526 plus the wrap angle offset of step 506.

In certain embodiments, individual processes described in connection with FIG. 5 may be combined, eliminated, or reordered.

In certain embodiments, computer program readable code, such as computer program readable code 632 (FIG. 6), is encoded in computer readable medium, such as computer readable medium 630 (FIG. 6), wherein that computer program readable code is executed by a processor, such as processor 622 (FIG. 6), to perform one or more of the steps 502, 504, 506, 508, 510, 512, 514, and/or 516 recited in FIG. 5.

In yet other embodiments, the invention includes computer program readable code residing in any other computer program product, where that computer program readable code is executed by a computer external to, or internal to, data storage device 600 (FIG. 6) to perform one or more of the steps 502, 504, 506, 508, 510, 512, 514, and/or 516 recited in FIG. 5. In either case the computer program readable code may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, CompactFlash, SmartMedia, and the like.

While the preferred embodiments of the present invention have been illustrated in detail, it should be apparent that modifications and adaptations to those embodiments may occur to one skilled in the art without departing from the scope of the present inventions.

What is claimed is:

1. A method for setting a wrap angle of a read/write head, comprising:
    supplying a data storage device comprising a roller disposed adjacent a read head/write head comprising a sloping upper surface, a servo element, and a plurality of servo band detection enabled read elements ("Enabled Read Elements"), wherein the servo element and each of the plurality of Enabled Read Elements can detect a servo band, moving a sequential information storage medium across said roller and said sloping upper surface at an initial wrap angle, wherein said sequential information storage medium comprises a servo band encoded therein and a longitudinal axis, wherein the longitudinal axis and the sloping upper surface define said initial wrap angle;
    incrementally adjusting said initial wrap angle by incrementally moving said roller until said servo band is not detected by the servo band or by any of the plurality of Enabled Read Elements;
    establishing an iteration number (N), wherein (N) is greater than or equal to 2;
wherein said incrementally adjusting step comprises adjusting an (i)th wrap angle to form an (i+1)th wrap angle, wherein (i) is greater than or equal to 1 and less than or equal to (N);
    incrementally adjusting, for each value of (i) an (i)th wrap angle until said servo band is not detected by the servo band or by any of the plurality of Enabled Read Elements;
    saving, for each value of (i), an (i)th nominal wrap angle; and
calculating an average nominal wrap angle;
    establishing a wrap angle offset;
    setting an operating wrap angle equal to said average nominal wrap angle plus said wrap angle offset.

2. The method of claim 1, further comprising:
    determining if said servo band is detected by an Enabled Read Element;
    operative if said servo band is detected by an Enabled Read Element, laterally adjusting the position of said read/write head with respect to said sequential information storage medium based upon the location of said Enabled Read Element detecting said servo band.

3. The method of claim 1, wherein said incrementally adjusting step further comprises:
    operative if an initial wrap angle was about 0 degrees, increasing said (i)th wrap angle to form said (i+1)th wrap angle;
    operative if said initial wrap angle was about 4 degrees, decreasing said (i)th wrap angle to form said (i+1)th wrap angle.

4. The method of claim 3, wherein:
    said increasing step comprises moving said roller in a first direction;
    said decreasing step comprises moving said roller in a second direction, wherein said first direction is opposite said second direction.

5. An article of manufacture comprising a non-transitory computer readable medium comprising computer readable program code disposed therein for setting a wrap angle of a data storage device comprising a roller disposed adjacent a read/write head comprising a sloping upper surface, a servo element, and a plurality of servo band detection enabled read elements ("Enabled Read Elements"), wherein the servo element and each of the plurality of Enabled Read Elements can detect a servo band, the computer readable program code comprising a series of computer readable program steps to effect:
    moving a sequential information storage medium across said roller and said sloping upper surface at an initial wrap angle, wherein said sequential information storage medium comprises a servo band encoded therein and a longitudinal axis, wherein the longitudinal axis and the sloping upper surface define said initial wrap angle;
    establishing an iteration number (N), wherein (N) is greater than or equal to 2;
wherein said incrementally adjusting step comprises adjusting an (i)th wrap angle to form an (i+1)th wrap angle, wherein (i) is greater than or equal to 1 and less than or equal to (N);
    incrementally adjusting, for each value of (i), an (i)th wrap angle until said servo band is not detected by the servo band or by any of the plurality of Enabled Read Elements;
    saving, for each value of (i), an (i)th nominal wrap angle; and
calculating an average nominal wrap angle;
    establishing a wrap angle offset;

setting an operating wrap angle equal to said average nominal wrap angle plus said wrap angle offset.

6. The article of manufacture of claim 5, said computer readable program code further comprising a series of computer readable program steps to effect:
   determining if said servo band is detected by an Enabled Read Element;
   operative if said servo band is detected by an Enabled Read Element, laterally adjusting the position of said sequential information storage medium with respect to said read/write head based upon the location of said Enabled Read Element detecting said servo band.

7. The article of manufacture of claim 5, wherein said computer readable program code to incrementally adjust an initial wrap angle further comprises a series of computer readable program steps to effect:
   operative if an initial wrap angle was about 0 degrees, increasing said (i)th wrap angle to form said (i+1)th wrap angle;
   operative if said initial wrap angle was about 4 degrees, decreasing said (i)th wrap angle to form said (i+1)th wrap angle.

8. The article of manufacture of claim 7, wherein:
   said computer readable program code to increase said (i)th wrap angle to form said (i+1)th wrap angle further comprising a series of computer readable program steps to effect moving said roller downwardly;
   said computer readable program code to decrease said (i)th wrap angle to form said (i+1)th wrap angle further comprising a series of computer readable program steps to effect moving said roller upwardly.

9. A computer program product encoded in a non-transitory computer readable medium and useable with a programmable computer processor for setting a wrap angle of a data storage device comprising a roller disposed adjacent a read/write head comprising a sloping upper surface, a servo element, and a plurality of servo band detection enabled read elements ("Enabled Read Elements"), wherein the servo element and each of the plurality of Enabled Read Elements can detect a servo band, the computer program product comprising:
   computer readable program code which causes said programmable processor to move a sequential information storage medium across said roller and said sloping upper surface at an initial wrap angle, wherein said sequential information storage medium comprises a servo band encoded therein and a longitudinal axis, wherein the longitudinal axis and the sloping upper surface define said initial wrap angle;
   computer readable program code which, if said servo band is detected by an Enabled Read Element, causes said programmable processor to laterally adjust the position of said sequential information storage medium with respect to said read head based upon the location of said Enabled Read Element detecting said servo band;
   computer readable program code which causes said programmable processor to establish an iteration number (N), wherein (N) is greater than or equal to 2;
   wherein said computer readable program code to incrementally adjust an initial wrap angle further comprises computer readable program code which causes said programmable processor to adjust an (i)th wrap angle to form an (i+1)th wrap angle, wherein (i) is greater than or equal to 1 and less than or equal to (N);
   computer readable program code which causes said programmable processor to incrementally adjust, for each value of (i), an (i)th wrap angle until said servo band is not detected by the servo band or by any of the plurality of Enabled Read Elements;
   computer readable program code which causes said programmable processor to saving, for each value of (i), an (i)th nominal wrap angle; and
   computer readable program code which causes said programmable processor to calculate an average nominal wrap angle;
   computer readable program code which causes said programmable processor to set an operating wrap angle equal to said average nominal wrap angle plus a wrap angle offset.

10. The computer program product of claim 9, further comprising:
   computer readable program code which, if an initial wrap angle was about 0 degrees, causes said programmable processor to increase said (i)th wrap angle to form said (i+1)th wrap angle;
   computer readable program code which, if an initial wrap angle was about 4 degrees, causes said programmable processor to decrease said (i)th wrap angle to form said (i+1)th wrap angle.

* * * * *